May 16, 1939.　　　　J. F. PRIESS　　　　2,158,380
CARBURETOR AIR INTAKE SYSTEM
Filed Oct. 8, 1937
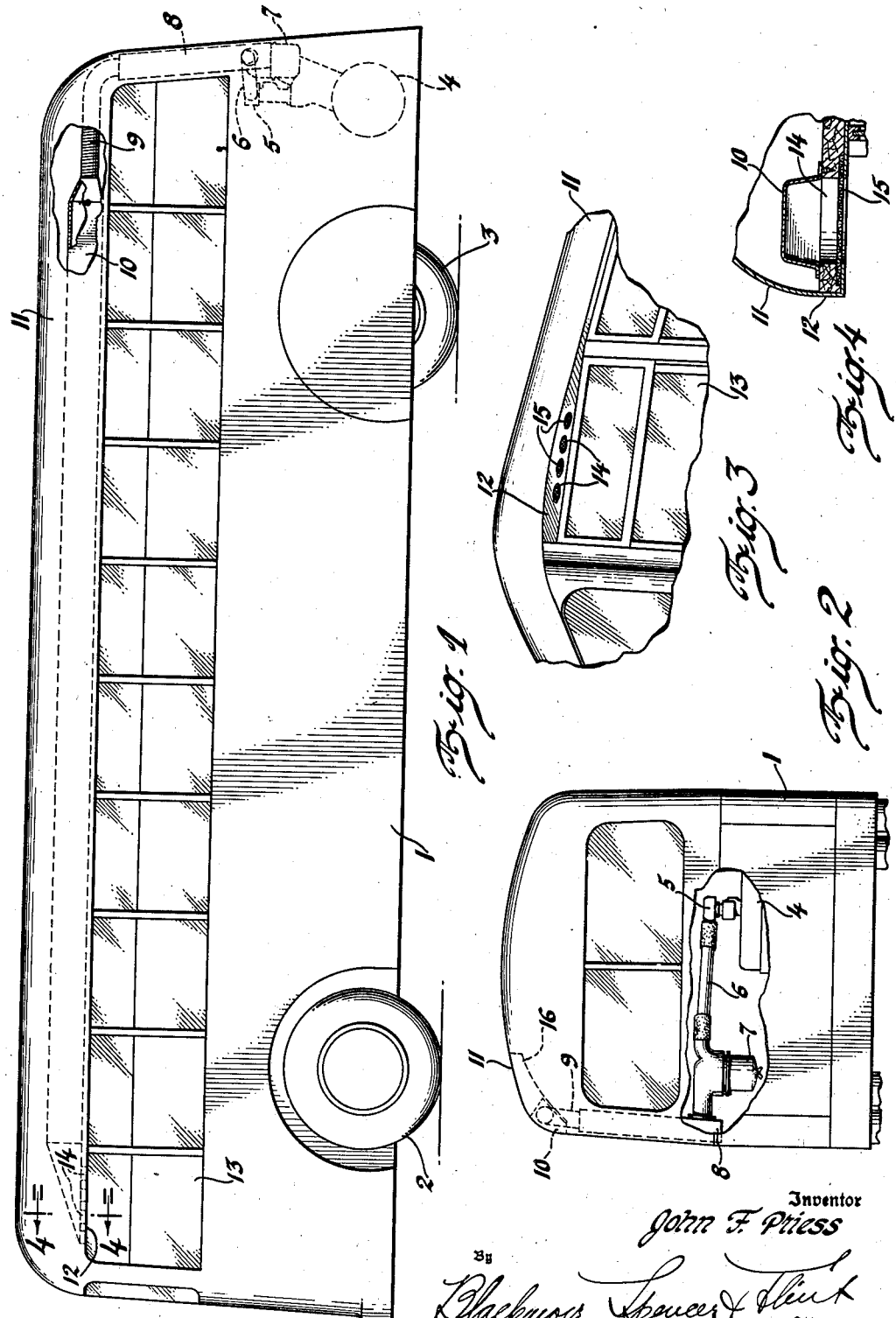
Inventor
John F. Priess
By
Blackmore, Spencer & Hunt
Attorney Patented May 16, 1939

2,158,380

UNITED STATES PATENT OFFICE 2,158,380

CARBURETOR AIR INTAKE SYSTEM

John F. Priess, Pontiac, Mich., assignor to Yellow Truck & Coach Manufacturing Company, Pontiac, Mich., a corporation of Maine Application October 8, 1937, Serial No. 167,950

5 Claims. (Cl. 180—54)

This invention relates to motor vehicle construction and more particularly to a clean air intake system for the carburetor of a rearwardly located engine. Where the engine is located in a compartment at the rear of a motor coach some trouble is had if the carburetor air supply is taken from within the engine compartment. Hot air from within the compartment decreases the volumetric efficiency of the engine, but aside from that the air is likely to be laden with dust kicked up by the road wheels, the dirt particles causing injury to valve seats and other operating mechanism.

It is an object of the present invention to seal the carburetor air intake from the engine compartment and supply clean and cooler air by incorporating a passageway or duct in the roof of the body where it will be out of the way and not interfere with passenger accommodation with the rear of the duct communicating with the carburetor and the front end opening for the entrance of air at a point forward of and high above road contact of the wheels. An additional advantage of the high entrance is that road dust stirred up by preceding vehicles settles back and hangs close to the ground rather than near the roof line of the following vehicle.

A further object of the invention is to provide for the movement of air into the duct entrance in an upward direction or opposite to the dust settling tendency and to locate the entrance in a region of relatively high pressure air during forward vehicle travel.

Another object is to provide a hollow body post which besides its use as a structural member serves as a part of the air intake system and is connected to the roof duct by a flexible conduit to relieve the parts from strain due to frame weaving and body distorsion.

Further objects and advantages of the invention will become apparent during the course of the following detailed specification having reference to the accompanying drawing wherein Figure 1 is a side elevation of a motor coach embodying the air intake system; Figure 2 is a rear elevation of the coach with parts broken away; Figure 3 is a perspective view showing the air intake at the front of the vehicle and Figure 4 is a detail section taken on line 4—4 of Figure 1.

Referring to the drawing the vehicle body 1 of a conventional type is supported upon front wheels 2 and rear wheels 3 and contains an engine compartment behind the rear wheels in which is located the engine 4. The carburetor which supplies an explosive mixture to the engine has its air intake 5 sealed from the engine compartment and is connected by a conduit 6 with an air cleaner 7 which is mounted on and communicates with the interior of the hollow body post 8 extending vertically at one corner between the rear body wall and an adjacent side body wall. This structural framing member 8 is closed at its lower end and at its upper end is connected by means of a flexible conduit or rubber hose 9 with a duct 10 extending longitudinally throughout the length of the vehicle. The flexible conduit 9 accommodates relative movement between the body post and the duct and avoids the imposition of the strain on the parts such as might occur due to twist in the frame when the road wheels are on uneven ground. The longitudinal duct 10 may be formed of relatively light gage sheet metal and it is mounted adjacent the curved panel at one side of the roof 11 where it will be to one side of passenger headroom. In the usual construction of motor coach, interior trim panels as at 16, are used overhead in spaced relation to the roof, the panels sometimes being employed for carrying advertising cards, and the air duct can conveniently be concealed in the space between the roof and trim panel.

At its forward end and immediately adjacent the front wall of the vehicle and forward of the front wheels 2 the duct terminates at the overhanging portion 12 of the roof beyond the foremost window 13 in the body side wall. A series of vertically disposed openings 14 preferably covered by a perforate screen 15 provide for the upward movement of air into the duct 10, the screen 15 tending to keep out dust particles. Dust particles collecting on the underside of the screen will drop or shake off from time to time as the vehicle moves on bumpy roads so that the screen is to some extent self cleaning. The overhanging roof portion 12 in this instance is formed by arranging the window 13 in a forwardly slanted plane or one which is diagonal to the longitudinal center line of the vehicle.

As the result of the vehicle moving forward the air struck by the front wall is deflected laterally for movement over the top and along the opposite side walls so that there is some compacting of air immediately adjacent the window 13 which assists in the intake of air through the openings 14. Gravity action on the dust particles plays a part in insuring that only the cleaner air will reach the duct. For example, the heavier particles upon being struck by the front wall will tend to drop in the air stream and additionally there will be less tendency for the heavier particles to move upwardly into the entrance openings 14 in the roof overhang. Furthermore, the dust is separated by the cleaner unit 7 but the location of the air intake at the front end of the vehicle will relieve the air cleaner 7 from work on unusually dirty air.

The structure and system described is useful with equal facility if the vehicle is to be propelled by a Diesel or other type of engine.

I claim:

1. In a vehicle body, a forwardly disposed side wall window extending diagonally to the longitudinal plane of the body, a roof overhang above said window, a longitudinally extending duct having a vertical air entrance opening in said roof overhang and means connecting the rear of the duct to an engine air intake.

2. In a vehicle body, a forwardly disposed side wall window extending diagonally to the longitudinal plane of the body, a roof overhang above said window, a longitudinally extending duct having a vertical air entrance opening in said roof overhang, an engine at the rear of the body having a combustion air inlet, a hollow body post affording an air intake passageway and a flexible conduit joining said hollow post with the rear of said duct.

3. In combination, a motor vehicle body having a rearwardly disposed engine compartment, an engine within said compartment having a combustion air intake sealed from said compartment, said body having a hollow post extending upwardly from the compartment and communicating with said intake, a roof duct extending longitudinally of the vehicle and opening at its forward end near the front of the body for the intake of air and a flexible conduit communicating the rear end of the duct with said hollow post.

4. In combination, a motor vehicle body having a roof overhang in the body side wall adjacent the front of the body and a rearwardly disposed engine compartment, an engine air intake within said compartment sealed from the compartment and a longitudinal roof duct communicating at its rear end with said air intake and having an air entrance opening in said roof overhang for the vertical movement of air thereinto.

5. In combination, a vehicle body having an engine compartment, an engine air intake located within and sealed from said compartment, a hollow body post communicating with said intake, an air duct extending longitudinally of the body and a flexible conduit joining said duct and the hollow post.

JOHN F. PRIESS.